(12) United States Patent
Noel et al.

(10) Patent No.: US 10,773,688 B2
(45) Date of Patent: Sep. 15, 2020

(54) MOTOR VEHICLE WINDOW DEICING FLUID, DEICING PROCESS AND PROCESS FOR CONVEYING THE DEICING FLUID

(71) Applicant: Valeo Systèmes d'Essuyage, Le Mesnil Saint Denis (FR)

(72) Inventors: Amélie Noel, Issoire (FR); Grégory Kolanowski, Issoire (FR); Denis Thebault, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 155 days.

(21) Appl. No.: 16/039,506

(22) Filed: Jul. 19, 2018

(65) Prior Publication Data

US 2019/0023227 A1    Jan. 24, 2019

(30) Foreign Application Priority Data

Jul. 21, 2017 (FR) ..................................... 17 56933

(51) Int. Cl.
 *C09K 3/18* (2006.01)
 *B60S 1/02* (2006.01)
 *B60S 1/48* (2006.01)
 *B60S 1/46* (2006.01)

(52) U.S. Cl.
 CPC ................. *B60S 1/023* (2013.01); *B60S 1/46* (2013.01); *B60S 1/482* (2013.01); *B60S 1/485* (2013.01); *C09K 3/185* (2013.01)

(58) Field of Classification Search
 CPC ................................... C09K 3/185; C09K 3/18
 USPC ........................................................ 252/70
 See application file for complete search history.

(56) References Cited

U.S. PATENT DOCUMENTS

| | | | |
|---|---|---|---|
| 6,696,399 B1 | 2/2004 | Chernin et al. | |
| 2004/0119043 A1 | 6/2004 | Dietl | |
| 2005/0230658 A1* | 10/2005 | Koefod | C09K 3/185 252/70 |
| 2012/0056004 A1 | 3/2012 | Trager | |
| 2014/0110624 A1* | 4/2014 | Demmer | C09K 3/185 252/70 |
| 2014/0319408 A1* | 10/2014 | Koefod | C09K 3/185 252/70 |

FOREIGN PATENT DOCUMENTS

| FR | 2 933 931 A1 | 1/2010 |
|---|---|---|
| RU | 2558765 C1 | 8/2015 |

OTHER PUBLICATIONS

Preliminary Report and Opinion issued in Corresponding French Application No. 1756933, dated Apr. 18, 2018 (13 Pages with Machine Translation).

* cited by examiner

*Primary Examiner* — Gregory E Webb
(74) *Attorney, Agent, or Firm* — Osha Liang LLP

(57) ABSTRACT

The invention relates to a motor vehicle deicing fluid comprising:
 at least one alkali metal salt, the weight percentage of all of the at least one alkali metal salt, in the fluid, being between 0.0001% and 50%,
 and at least water, the weight percentage of water in the fluid being between 0.0001% and 99.9999%.

12 Claims, 3 Drawing Sheets

MOTOR VEHICLE WINDOW DEICING FLUID, DEICING PROCESS AND PROCESS FOR CONVEYING THE DEICING FLUID

TECHNICAL FIELD

The present invention relates to a deicing fluid, in particular for a motor vehicle.

Frost is composed of a multitude of water droplets that are frozen as soon as the outside temperature drops below zero degrees Celsius. Generally, these droplets have little or no cohesion with one another.

PRIOR ART

Deicing fluids are known that are used to deice the outer surface of a motor vehicle window such as a windscreen. These deicing fluids make it possible to melt the frost formed on the windscreen of the vehicle. There is however a need to improve these deicing fluids.

Deicing fluids are furthermore known that are designed for deicing roads in winter. Document US 2004/0119043 A1 discloses such a deicing fluid. However, these fluids are not very suitable for use for a motor vehicle.

For deicing, motor vehicles may comprise spray systems using in particular windscreen washer fluid pumps. The deicing fluid must therefore be compatible with the use of these windscreen washer fluid pumps. There is therefore a need to have a deicing fluid that exhibits physical properties, in particular viscosity properties, that are compatible with use in a window wiping system of a motor vehicle.

One of the objectives of the Invention is to meet these needs.

BRIEF DESCRIPTION OF THE FIGURES

The invention will be better understood, and other objectives, details, features and advantages thereof will become more clearly apparent in the course of the following detailed description with reference to the appended drawings, in which.

SUMMARY OF THE INVENTION

Figure 1:
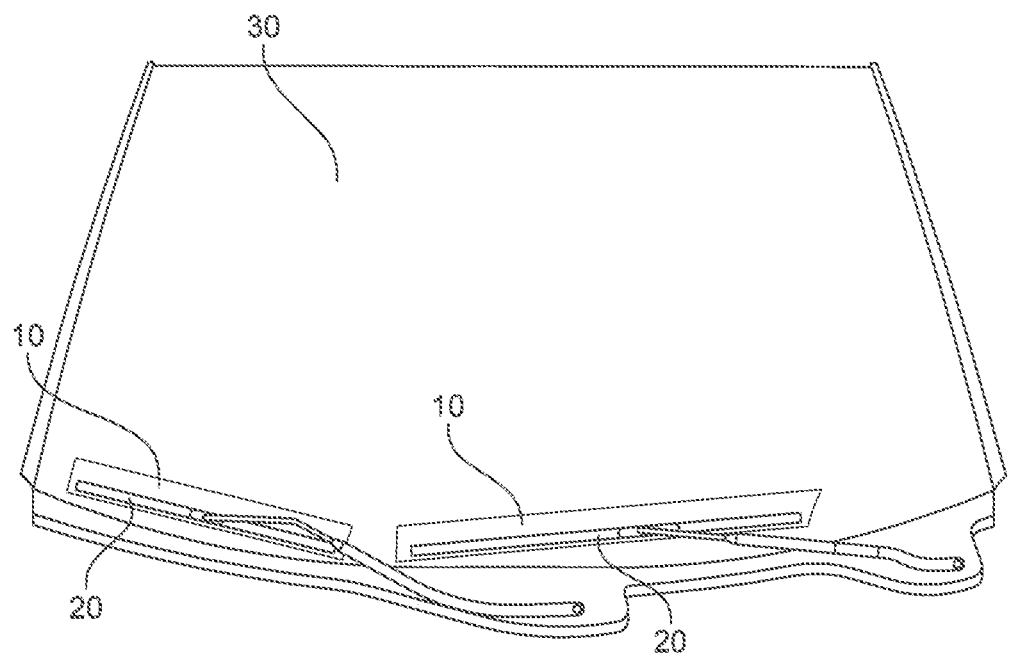
FIGS. 1 to 5 are schematic views of a portion of a motor vehicle windscreen during various steps of a deicing process according to the invention.

The invention proposes a motor vehicle deicing fluid comprising:

at least one alkali metal salt, the weight percentage of all of the at least one alkali metal salt, in the fluid, being between 0.0001% and 50%, and at least water, the weight percentage of water in the fluid being between 0.0001% and 99.9999%.

In the present application, the weight percentage of a component is understood to mean the ratio that the mass of this component to the total mass of the deicing fluid represents.

Owing to this formulation, the deicing fluid according to the invention has a powerful deicing ability while having physical properties that enable the use thereof for deicing a motor vehicle.

The deicing fluid is intended to be distributed, squirted and/or sprayed on the surface, in particular outer surface, of a motor vehicle window when it is covered, at least partially, with a layer of frost.

The deicing fluid, intended to be distributed on an outer surface of a motor vehicle window, covered at least partially with a layer of frost, is characterized in that the freezing point of a mixture comprising frost and the deicing fluid is below the freezing point of the frost alone. In that way, the distribution and/or spraying of the deicing fluid on the vehicle window makes it possible to melt the frost present thereon.

The freezing point of the mixture comprising frost and deicing fluid is for example below or equal to −20 degrees Celsius.

Moreover, the deicing fluid also makes it possible to prevent, or at the very least, to slow down a formation and/or a reformation of the frost in particular after the deicing fluid has been distributed on the outer surface of the window. In other words, the deicing fluid is designed so as to prevent a return of the ice on the window in particular so that the visibility is lastingly preserved for the driver.

The deicing fluid may for example also be used to melt snow on the outer surface of the window.

The freezing point of the deicing fluid is in particular a function of the alkali metal salt concentration thereof.

According to the invention, the weight percentage of all of the at least one alkali metal salt, in the fluid, is less than 50%. In other words, in the case where the deicing fluid comprises several alkali metal salts, the sum of the weight percentages of each of the alkali metal salts is less than or equal to 50%.

Preferably, the weight percentage of all of the at least one alkali metal salt is between 30% and 50%. Better still, the weight percentage of all of the at least one alkali metal salt is between 40% and 50%. Even better still, the weight percentage of all of the at least one alkali metal salt is between 45% and 50%.

In the deicing fluid, one of the at least one alkali metal salts may be potassium formate.

The deicing fluid may comprise at least two alkali metal salts. In particular, the deicing fluid may comprise a mixture of several alkali metal salts, including potassium formate or other potassium salts such as formic acid, acetate, succinate and/or formate of a metal ion without this list being limiting.

Without departing from the scope of the invention, the deicing fluid may comprise a single alkali metal salt, in particular potassium formate. As a variant, it may be another alkali metal salt. The weight percentage of the single alkali metal salt is for example between 45% and 50%.

The deicing fluid may further comprise an antifreeze agent intended to prevent the formation and/or the reformation of frost. The antifreeze agent advantageously enables the deposition of a fatty film on the surface of the window so as to prevent or slow down the formation or the reformation of frost on the surface. Advantageously, the addition of antifreeze agent also makes it possible to lower the freezing point of the deicing fluid.

The weight percentage of the antifreeze agent is for example between 0.0001% and 5%. The antifreeze agent is for example ethylene glycol, glycerol, propylene glycol, methanol or a mixture of these products. Preferably, the antifreeze agent has a molar mass of 84 g·mol$^{-1}$.

The deicing fluid may further comprise a fragrancing agent. The fragrancing agent comprises for example S-limonene. The weight percentage of the fragrancing agent in the deicing fluid is for example between 0.0001% and 5%. Preferably, the weight percentage of the fragrancing agent is between 0.0001% and 0.3% or even between 0.05% and 0.2%.

The deicing fluid may further comprise a corrosion inhibitor. The corrosion inhibitor is designed to prevent corrosion of a container of the deicing fluid or of a distribution circuit thereof or else of components of the windscreen of the motor vehicle. In particular, the corrosion inhibitor is especially intended to prevent an oxidation of metal components of the motor vehicle.

The corrosion inhibitor may for example be phosphate, borate or silicate or a mixture of these products. The weight percentage of the corrosion inhibitor is for example between 0.0001% and 3%.

The deicing fluid may be devoid of any solvent other than water. In other words, the deicing fluid then comprises no solvent other than water.

As a variant, the deicing fluid may further comprise a solvent other than water. The weight percentage of this other solvent is for example between 0.0001% and 5%. The deicing fluid may also comprise several solvents other than water. The weight percentage of all of the solvents other than water in the deicing fluid is then between 0.0001% and 5%.

The solvent other than water in the deicing fluid makes it possible for example to give the deicing fluid a washing and/or solubilizing ability. It may additionally make it possible to reduce the surface tension of the deicing fluid. In other words, the solvent may make it possible to increase the wetting power of the deicing fluid. The solvent may additionally enable a lowering of the freezing point of the deicing fluid.

In particular, the deicing fluid may especially comprise glycol or a compound belonging to the family of glycols. The glycol or the compound belonging to the family of glycols may constitute the other solvent.

The deicing fluid may for example comprise 1-methoxy-2-propanol or dipropylene glycol monomethyl ether that can be used in order to lower the freezing point of the deicing fluid.

The deicing fluid may for example comprise a viscosity agent intended to modify, via its addition, the viscosity of the deicing fluid.

Advantageously, the deicing fluid has a low viscosity. Preferably, the deicing fluid has a viscosity at low temperature, in particular at −15 degrees Celsius, of less than or equal to 10 millipascal-seconds (10 mPa·s). The viscosity of the deicing fluid at −15 degrees Celsius is for example less than or equal to 8 mPa·s. As a variant, the viscosity of the deicing fluid is for example less than or equal to 10 millipascal-seconds (10 mPa·s) at a temperature of −20 degrees Celsius.

The low viscosity of the deicing fluid enables the deicing fluid to be conveyed, irrespective of the ambient temperature, and especially at negative temperatures, by a windscreen washer fluid pump of a motor vehicle, the deicing fluid being at ambient temperature.

Preferably, the deicing fluid is designed so that its freezing point is below or equal to −20 degrees Celsius. In particular, the freezing point of the deicing fluid is between −20 degrees Celsius and −30 degrees Celsius. As a variant, the freezing point of the deicing fluid is for example below or equal to −30 degrees Celsius.

An example of a deicing fluid in accordance with the invention has been described hereinafter.

The deicing fluid comprises for example potassium formate, the weight percentage of the potassium formate being between 45% and 50% of the deicing fluid. The freezing point of the deicing fluid is here below −30 degrees Celsius. Its viscosity, at a temperature of minus 20 degrees Celsius, is less than or equal to 10 mPa·s. The deicing fluid further comprises an antifreeze agent, the weight percentage of which in the deicing fluid is between 0.0001% and 5%. The deicing fluid further comprises a corrosion inhibitor, the weight percentage of which in the deicing fluid is less than 3%.

As illustrated in FIGS. 1 to 5, the invention also relates to a process for deicing an outer surface 30 of a motor vehicle window, the vehicle being equipped with at least one wiper blade 20, here two wiper blades 20. This deicing process comprises successively, and for example in this order, a step A), a step B) and a step C).

Step A) is a step of distributing a deicing fluid 10 according to the invention on the outer surface 30. During step A), preferably, the wiper blades 20 are not moved.

Step B) is a delaying step during which the wiper blades 20 are not moved. During step B), preferably, no distribution of the deicing fluid 10 takes place.

Figure 2:
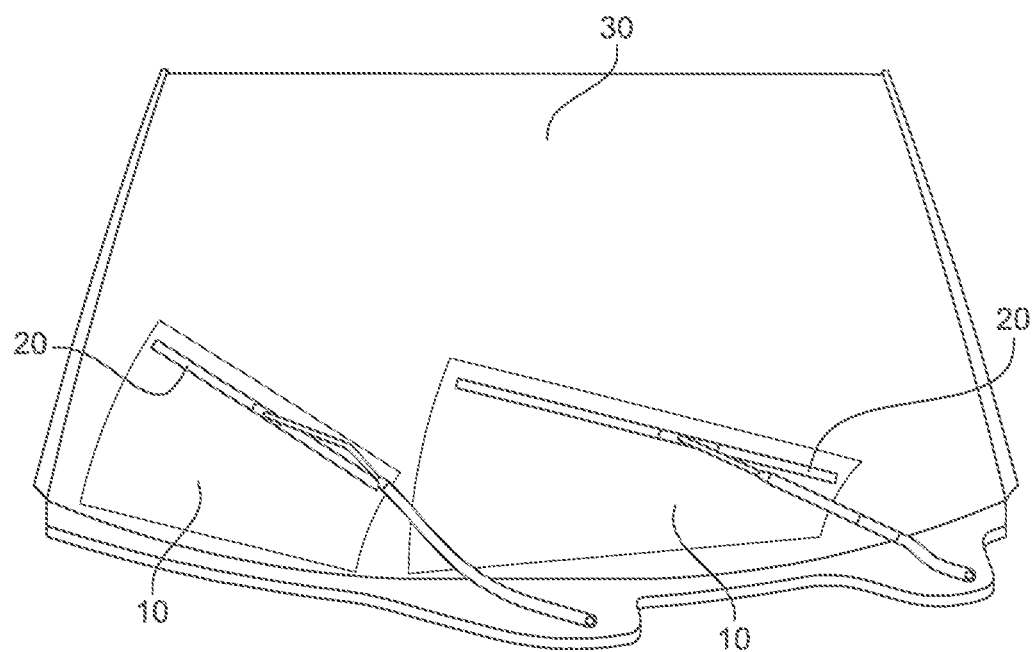

Step C) is illustrated in FIG. 2. Step C) consists of a movement of the wiper blades 20 from a first position P1 to a second position P2. Preferably, the moving step C) takes place at the same time as a distribution of the deicing fluid 10 on the outer surface 30. Preferably, the first position P1 corresponds to the extreme bottom position of the wiper blades 20 on the windscreen, whilst the second position P2 corresponds to the extreme top position of the wiper blades 20 on the windscreen.

Step C) is for example followed successively by a step D) and by a step E).

Figure 3:
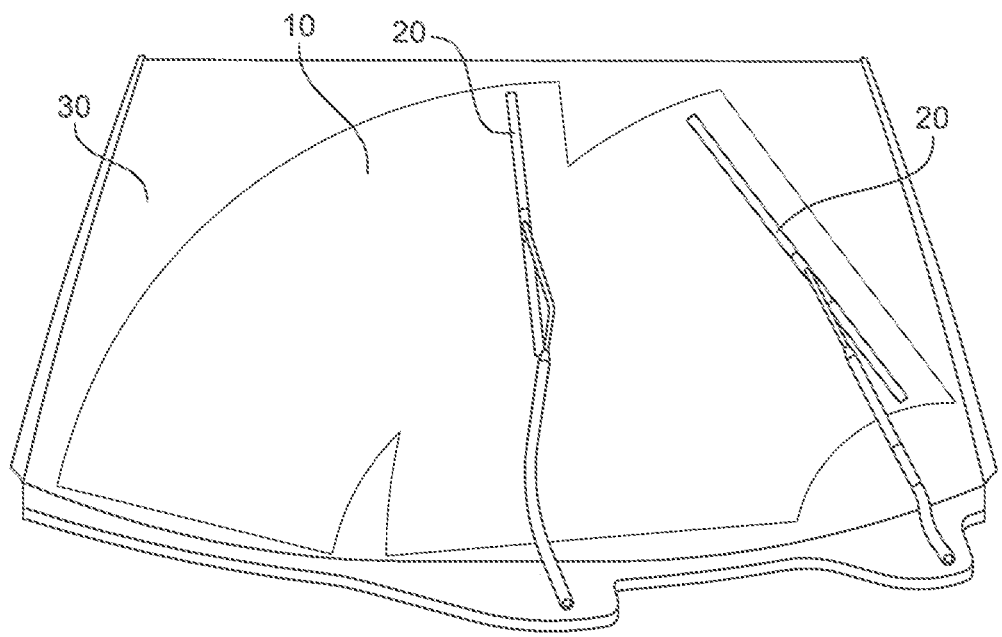

Step D) is Illustrated in FIG. 3. It Is a delaying step during which the wiper blades 20 are not moved. During step D), preferably, no distribution of deicing fluid takes place.

Figure 4:
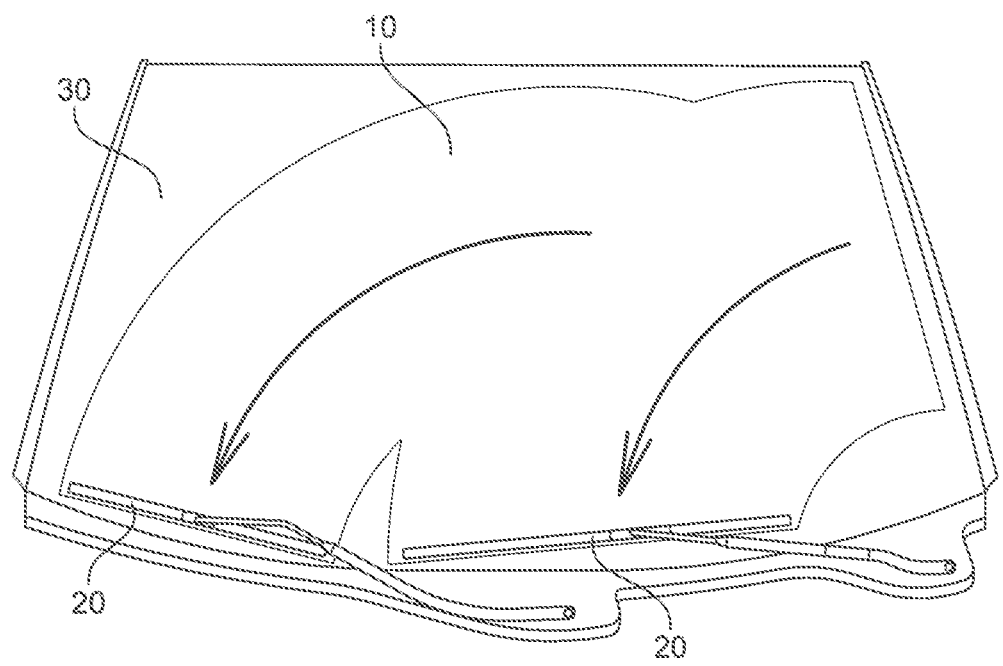

Step E) is illustrated in FIG. 4. It is a step of moving the wiper blades 20 from the second position P2 to the first position P1. Preferably, step E) takes place at the same time as a distribution of the deicing fluid (10) on the outer surface. Alternatively, during step E), no distribution of deicing fluid takes place.

It will be noted that the movement of the wiper blades 20 during step C) is for example sequenced. In other words, the wiper blades 20 move from the first position P1 to a second position P2 in several successive movements, the blades 20 being Immobilized for a few seconds between successive movements. Alternatively, during step C), the wiper blades 20 move at a speed slower than that of the wiper blades during step E).

The delaying time of each of the steps B) and/or D) is for example between 10 seconds and 1 minute. For example, the delaying time of each of the steps B) and D) is approximately 30 seconds. The delaying steps make it possible in particular to leave the deicing fluid 10 to act on the outer surface 30. In particular, the delaying steps make it possible to wait for the frost or a portion of the frost to melt before setting the wiper blades 20 in motion.

Figure 5:
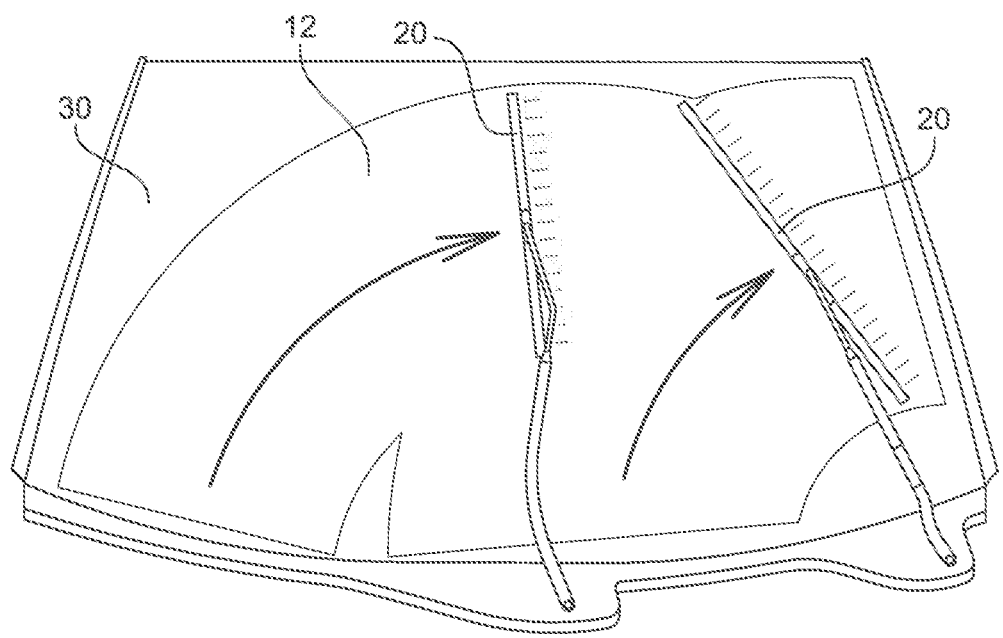

The deicing process may further comprise a rinsing step. The rinsing step Is illustrated in FIG. 5. It consists for example of a distribution of a windscreen washer fluid 12 or a distribution of water on the outer surface 30, the windscreen washer fluid 12 or the water acting as rinsing fluid.

Step A) may be preceded or replaced by a step X). Step X), illustrated in FIG. 1, consists of a distribution of the deicing fluid 10 in the zones of the outer surface 30 occupied by the wiper blades 20 of the motor vehicle. Generally, these are zones located in a lower portion of the outer surface where the wiper blade (20) is found in the rest position. In other words, the deicing fluid 10 is distributed, during step X), on the outer surface 30 around an interface or a zone of contact between, on the one hand, the wiper blades 20 and, on the other hand, the outer surface 30 or the frost covering the outer surface 30.

Specifically, when frost is present on the outer surface 30, the wiper blades 20 are sometimes stuck thereto or held by the frost. Step X makes it possible, where appropriate, to unstick or free the wiper blades 20 from the outer surface 30 before they are actuated and in order to avoid the deterioration thereof.

Figure 6:
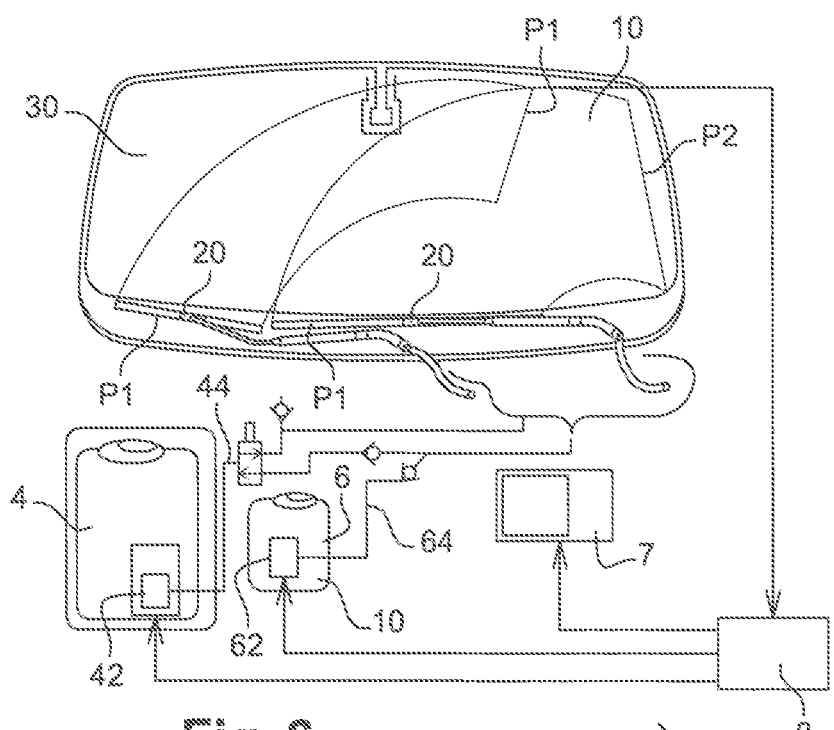
FIG. 6 is a view of a portion of a windscreen and of a device for conveying a deicing fluid.

FIG. 6 illustrates a device 1 for conveying the deicing fluid 10 from a reservoir 6 to the outer surface 30 of the motor vehicle.

This device 1 comprises a deicing fluid reservoir 6 intended to contain the deicing fluid 10 and a windscreen washer fluid reservoir 4 intended to contain the windscreen washer fluid 12.

The deicing fluid reservoir 6 is connected via a first circuit to spraying means. In other words, the first circuit is designed in order to link the deicing fluid reservoir 6 to the spraying means. The first circuit comprises a line 64 and a pump 62. The pump 62 makes it possible to circulate the deicing fluid 10 within the line 64 from the reservoir 6 of deicing fluid 10 to the spraying means.

The windscreen washer fluid reservoir 4 is connected via a second circuit to spraying means. In other words, the second circuit is designed in order to link the windscreen washer fluid reservoir 4 to the spraying means. The second circuit comprises a line 44 and a pump 42. The pump 42 makes it possible to circulate the windscreen washer fluid 12 within the line 44 from the reservoir 4 of windscreen washer fluid 12 to the spraying means.

The spraying means are designed to enable an atomization, spraying and/or distribution of the deicing fluid 10 and/or of the windscreen washer fluid 12 to a portion of the outer surface 30. The spraying means are for example arranged on a motor vehicle bonnet or directly on the wiper blades 20 or directly on the arms supporting the wiper blades 20.

This device 1 further comprises a control unit 8. The control unit 8 is connected to each of the pumps 42, 62 described previously. It enables the actuation of the pumps 42, 62.

The control unit 8 is moreover connected to a motor 7 for actuating the wiper blades 20. The control unit 8 is thus designed so as to enable control of the movement of the wiper blades 20.

The invention further relates to a process for conveying the deicing fluid 10. This process is characterized in that it consists in:
sucking up the deicing fluid 10 from the deicing fluid reservoir 6,
circulating the deicing fluid 10 in the line 64 of the first circuit,
spraying or squirting the deicing fluid 10 on the outer surface 30.

The invention claimed is:

1. A deicing fluid for a motor vehicle, comprising:
at least two alkali metal salts, the weight percentage of all of the at least two alkali metal salts, in the fluid, being between 30% and 50%; and
at least water, the weight percentage of water in the fluid being between 0.0001% and 99.9999%,
wherein one of the at least two alkali metal salts is potassium formate.

2. The deicing fluid according to claim 1, further comprising:
an antifreeze agent intended to prevent the formation and/or the reformation of frost, the weight percentage of the antifreeze agent is between 0.0001% and 5%.

3. The deicing fluid according to claim 1, further comprising:
a corrosion inhibitor, the weight percentage of the corrosion inhibitor is between 0.0001% and 3%.

4. The deicing fluid according to claim 1, further comprising:
a solvent other than water, wherein the weight percentage of the other solvent is between 0.0001% and 5%.

5. The deicing fluid according to claim 1, further comprising glycol or a compound belonging to the family of glycols.

6. The deicing fluid according to claim 1, said deicing fluid comprising no solvent other than water.

7. The deicing fluid according to claim 1, wherein the viscosity of the deicing fluid is less than or equal to 10 millipascal-seconds (mPa·s) at a temperature of −20 degrees Celsius.

8. The deicing fluid according to claim 1, wherein the freezing point of the deicing fluid is below or equal to −30 degrees Celsius.

9. The deicing fluid according to claim 1, wherein the deicing fluid is distributed over an outer surface of a window of a motor vehicle, covered at least partially with a layer of frost, wherein the freezing point of a mixture comprising frost and the deicing fluid is below the freezing point of the frost alone, below or equal to −20 degrees Celsius.

10. A process for deicing an outer surface of a motor vehicle window, the outer surface being equipped with a wiper blade, the deicing process successively comprising:
a step A of distributing a deicing fluid on the outer surface, wherein during step A the wiper blade is not moved, the deicing fluid comprising:
at least one alkali metal salt, the weight percentage of all of the at least one alkali metal salt, in the fluid, being between 0.0001% and 50%, and
at least water, the weight percentage of water in the fluid being between 0.0001% and 99.9999%;
a delaying step B during which the wiper blade is not moved and no distribution of the deicing fluid on the outer surface takes place; and
a step C of moving the wiper blade from a first position to a second position, wherein the moving step C takes place at the same time as a distribution of the deicing fluid on the outer surface.

11. The deicing process according to claim 10, in which step C is followed successively:
by a delaying step D during which the wiper blade is not moved and no distribution of the deicing fluid on the outer surface takes place; and
by a step E of moving the wiper blade from the second position to the first position.

12. The deicing process for conveying a deicing fluid according to claim 10, wherein the distribution consists in:
sucking up the deicing fluid from a reservoir,
circulating the deicing fluid in a line, and
spraying or squirting the deicing fluid on the outer surface of the window.

* * * * *